US010504371B2

(12) United States Patent
Hori et al.

(10) Patent No.: US 10,504,371 B2
(45) Date of Patent: Dec. 10, 2019

(54) DRIVE ASSIST APPARATUS AND DRIVE ASSIST SYSTEM

(71) Applicant: TOYOTA JIDOSHA KABUSHIKI KAISHA, Toyota-shi, Aichi-ken (JP)

(72) Inventors: Takashige Hori, Aisai (JP); Makoto Akahane, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/168,375

(22) Filed: Oct. 23, 2018

(65) Prior Publication Data

US 2019/0130757 A1 May 2, 2019

(30) Foreign Application Priority Data

Oct. 26, 2017 (JP) .................................. 2017-207359

(51) Int. Cl.
*G08G 1/16* (2006.01)
*B60R 11/04* (2006.01)
(Continued)

(52) U.S. Cl.
CPC ............. *G08G 1/166* (2013.01); *B60Q 9/008* (2013.01); *B60R 11/04* (2013.01);
(Continued)

(58) Field of Classification Search
CPC . B60Q 9/008; B60R 11/04; B60R 2300/8093; B60W 2420/42;
(Continued)

(56) References Cited

U.S. PATENT DOCUMENTS 9,849,832 B2* 12/2017 Mori ..................... B60Q 9/00
2014/0249722 A1* 9/2014 Hegemann ............ G08G 1/16
701/41

FOREIGN PATENT DOCUMENTS

| JP | 2010-113601 A | 5/2010 |
| JP | 2012-234499 A | 11/2012 |
| JP | 2014-006700 A | 1/2014 |

* cited by examiner

*Primary Examiner* — Omeed Alizada
(74) *Attorney, Agent, or Firm* — Hunton Andrews Kurth LLP

(57) ABSTRACT

A drive assist system according to an aspect of the present invention comprises: an image analysis unit that analyzes an image captured by a forward-shooting camera mounted on a vehicle and identifies, when recognizing a person performing an action in a direction toward an obstacle located so as to face a traffic lane ahead of the vehicle and an object moving toward the traffic lane ahead of the vehicle from a rear of the obstacle, a combination of the recognized action of the person and the recognized object as a type of dangerous scene; a storage unit that stores dangerous scene type information related to the identified type of dangerous scene; a judgment unit that judges whether or not there is an action of a person included in the dangerous scene type information stored in the storage unit which is similar to the action of the person recognized based on the image captured by the camera; a drive assist unit that assists driving by alerting a driver by notifying the driver that an object included in dangerous scene type information which has been judged as including a similar action of a person is likely to appear in the traffic lane ahead of the vehicle.

7 Claims, 5 Drawing Sheets

(51) Int. Cl.
*B60W 30/095* (2012.01)
*B60W 50/14* (2012.01)
*G06T 7/73* (2017.01)
*B60Q 9/00* (2006.01)
*G06K 9/00* (2006.01)
*G07C 5/08* (2006.01)

(52) U.S. Cl.
CPC ........ *B60W 30/0956* (2013.01); *B60W 50/14* (2013.01); *G06K 9/00342* (2013.01); *G06K 9/00355* (2013.01); *G06K 9/00369* (2013.01); *G06K 9/00805* (2013.01); *G06T 7/75* (2017.01); *G07C 5/0866* (2013.01); *B60R 2300/8093* (2013.01); *B60W 2050/143* (2013.01); *B60W 2050/146* (2013.01); *B60W 2420/42* (2013.01)

(58) Field of Classification Search
CPC .............. B60W 30/0956; B60W 50/14; G06K 9/00369; G06K 9/00805
See application file for complete search history.

DRIVE ASSIST APPARATUS AND DRIVE ASSIST SYSTEM

CROSS-REFERENCES TO RELATED APPLICATIONS

This application relates to and claims priority from Japanese Patent Application No. 2017-207359, filed on Oct. 26, 2017, the entire disclosure of which is incorporated herein by reference.

BACKGROUND

Field

The present invention elates to a drive assist apparatus and a drive assist system.

Description of Related Art

JP2012-234499 A discloses a drive assist apparatus that provides driving assist by predicting, at an earlier moment, a likelihood that a pedestrian located on the roadside of a traffic lane in which a vehicle is travelling will cross the traffic lane, to thereby prevent the vehicle from colliding with the pedestrian.

In JP2012-234499 A, although it is possible to predict the likelihood that the pedestrian who has been detected by a camera mounted on the vehicle will cross the traffic lane, it is not possible to predict the likelihood that an object which cannot be detected by the in-vehicle camera, such as a person or an object moving toward the traffic lane from the rear of a building located so as to face the traffic lane, will cross the traffic lane.

SUMMARY

In view of the above circumstances, an object of the present invention is to provide a drive assist apparatus and a drive assist system capable of predicting a likelihood that an object which cannot be detected by an in-vehicle camera will cross a traffic lane.

A drive assist apparatus according to an aspect of the present invention is a drive assist apparatus mounted on a vehicle, which includes: a transmission unit that transmits an image captured by a forward-shooting camera mounted on the vehicle to a server; a receiving unit that receives dangerous scene type information from the server, the dangerous scene type information being related to a type of dangerous scene consisting of a combination of a person who performs an action in a direction toward an obstacle located so as to face a traffic lane ahead of the vehicle and an object moving from a rear of the obstacle toward the traffic lane ahead of the vehicle, the action of the person and the object having been recognized by analyzing the image; a storage unit that stores the received dangerous scene type information; a judgment unit that judges whether or not there is an action of a person included in the dangerous scene type information stored in the storage unit which is similar to the action of the person recognized based on the image captured by the camera; and a drive assist unit that assists driving by, when the judgment unit judges that there is a similar action of a person, alerting a driver by notifying the driver that an object included in dangerous scene type information which has been judged as including the similar action of a person is likely to appear in the traffic lane ahead of the vehicle.

In such aspect, the receiving unit may receive the dangerous scene type information transmitted from the server at least one of: each time the dangerous scene type information is stored in the server; and/or at predetermined intervals.

In such aspect, the person performing an action toward the obstacle may be at least one of a person waving one's hand toward the obstacle and/or a person turning one's gaze or face toward the obstacle.

In such aspect, the drive assist unit may alert the driver at least one of: by outputting a voice message from a speaker; and/or by displaying on a display a message constituted by an image including characters.

A drive assist system according to another aspect of the present invention includes: an image analysis unit that analyzes an image captured by a forward-shooting camera mounted on a vehicle and identifies, when recognizing a person performing an action in a direction toward an obstacle located so as to face a traffic lane ahead of the vehicle and an object moving toward the traffic lane ahead of the vehicle from a rear of the obstacle, a combination of the recognized action of a person and the recognized object as a type of dangerous scene; a storage unit that stores dangerous scene type information related to the identified type of dangerous scene; a judgment unit that judges whether or not there is an action of a person included in the dangerous scene type information stored in the storage unit which is similar to the action of the person recognized based on the image captured by the camera; and a drive assist unit that assists driving by, when the judgment unit judges that there is a similar action of a person, alerting a driver by notifying the driver that the object in the dangerous scene type information which has been judged as including the similar action of a person is likely to appear in the traffic lane ahead of the vehicle.

In such aspect, the person performing an action toward the obstacle may be at least one of a person waving one's hand toward the obstacle and/or a person turning one's gaze or face toward the obstacle.

In such aspect, the drive assist unit may alert the driver at least one of: by outputting a voice message from a speaker; and/or by displaying on a display a message constituted by an image including characters.

According to the present invention, it is possible to provide a drive assist apparatus and a drive assist system capable of predicting a likelihood that an object which cannot be detected by an in-vehicle camera will cross a traffic lane.

DETAILED DESCRIPTION

Figure 1:
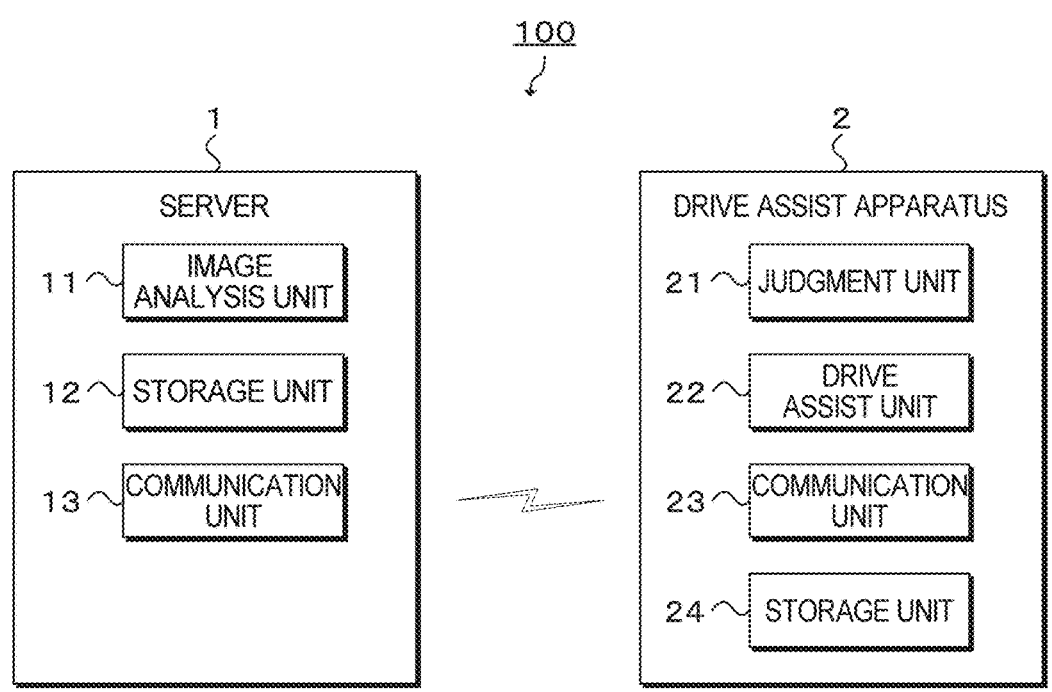
FIG. 1 is a diagram illustrating a configuration of a drive assist system that includes a drive assist apparatus according to an embodiment of the present invention.

A preferred embodiment of the present invention will now be described below with reference to the attached drawings. In the drawings, like reference numerals denote common or similar components.

The following description will describe a configuration of a drive assist system that includes a drive assist apparatus according to the present embodiment with reference to FIG. 1. A drive assist system 100 may include, for example, a server 1 arranged in a data center or the like and a driver assist apparatus 2 mounted on a vehicle. The server 1 and the drive assist apparatus 2 are configured so as to communicate with each other via a wireless network.

The server 1 may have functional configurations such as an image analysis unit 11, a storage unit 12 and a communication unit 13. The server 1 may include physical configurations such as a control unit including a CPU (Central Processing Unit) and a memory, a storage device, a communication device, etc. When the CPU executes a predetermined program stored in the memory, a function of each of the image analysis unit 11, the storage unit 12 and the communication unit 13 is fulfilled. Each of such functions will be described below.

The image analysis unit 11 analyzes an image received from the drive assist apparatus 2. The image received from the drive assist apparatus 2 is an image captured by a forward-shooting camera (to be described later) mounted on the vehicle.

The image analysis unit 11 analyzes an image and identifies a type of dangerous scene. The type of dangerous scene may be determined by, for example, a combination of: a person who performs an action in a direction toward an obstacle which is located so as to face a traffic lane ahead of the vehicle; and an object moving toward the traffic lane ahead of the vehicle from the rear of the obstacle. The object may be a moving object, examples of which may include a person, an animal, a vehicle, a bicycle and so on.

Specifically, the image analysis unit 11 analyzes the image, recognizes each of: a person who performs an action in the direction toward the obstacle which is located so as to face the traffic lane ahead of the vehicle; and an object moving toward the traffic lane ahead of the vehicle from the rear of the obstacle, and identifies the type of dangerous scene based on the recognized person and object. The types of dangerous scenes will be described in more detail below with reference to FIGS. 2 and 3.

Figure 2:
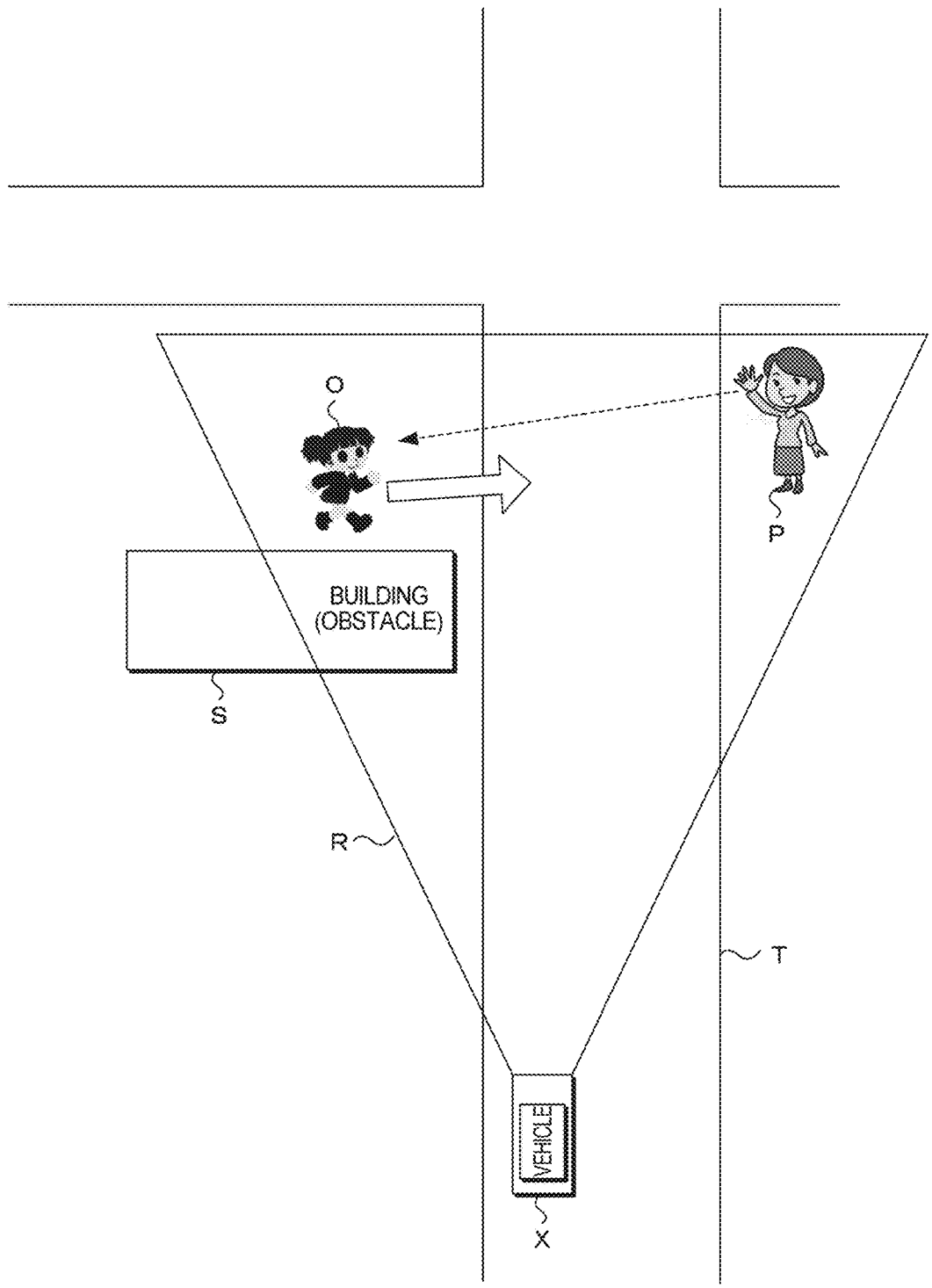
FIG. 2 is a schematic diagram illustrating a type of dangerous scene.

FIG. 2 is a schematic diagram showing a situation in which a person P and a building S are located within a video range R of a camera mounted on a vehicle X travelling in a traffic lane T. The person (e.g., a mother) P performs an action of waving her hand toward the building S located so as to face the traffic lane T ahead of the vehicle X. After this moment, an object (e.g., a child) moving toward the traffic lane T ahead of the vehicle from the rear of the building S is detected by the in-vehicle camera and recognized by the image analysis unit 11.

In such case, the person performing the hand waving action toward the building S and the object (person) moving toward the traffic lane T from the rear of the building S are identified as a type of dangerous scene.

Figure 3:
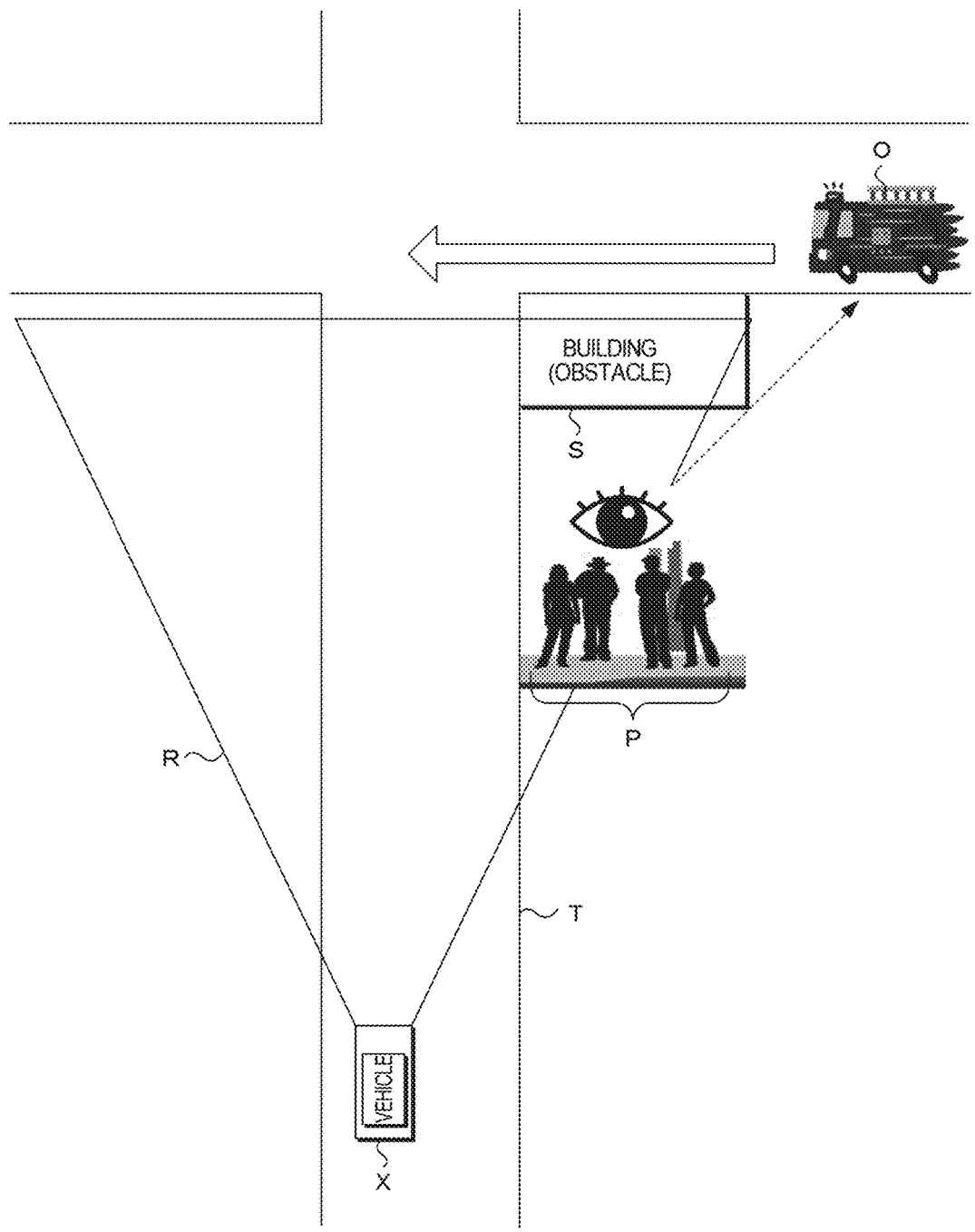
FIG. 3 is a schematic diagram illustrating another type of dangerous scene.

FIG. 3 is a schematic diagram showing a situation in which a plurality of people P and a building S are located within the video range R of the camera mounted on the vehicle X travelling in the traffic lane T. The plurality of people (e.g., passersby) P are performing actions of turning their gazes or faces toward the building S which is located so as to face the traffic lane T ahead of the vehicle X. After this moment, an object (e.g., a firetruck) moving toward the traffic lane T ahead of the vehicle from the rear of the building S is detected by the in-vehicle camera and recognized by the image analysis unit 11.

In such case, the plurality of people performing the actions of turning their gazes or faces toward the building S and the object (vehicle) moving toward the traffic lane T from the rear of the building S are identified as a type of dangerous scene.

Referring back to FIG. 1, the storage unit 12 in the server 1 stores dangerous scene type information related to types of dangerous scenes identified by the image analysis unit 11.

The communication unit 13 in the server 1 controls communications with another apparatus. For example, the communication unit 13 may receive an image transmitted from the drive assist apparatus 2 and transmit the dangerous scene type information stored in the storage unit 12 to the drive assist apparatus 2. The timing for sending the dangerous scene type information to the drive assist apparatus 2 may be set as appropriate such that, for example, the dangerous scene type information may be transmitted each time it is stored or at predetermined intervals.

The drive assist apparatus 2 shown in FIG. 1 may include functional configurations such as a judgment unit 21, a drive assist unit 22, a communication unit 23 and a storage unit 24. The drive assist apparatus 2 may include physical configurations such as a control unit including a CPU and a memory, a communication device, a storage device, a camera, a manipulation unit, a display and a speaker. When the CPU executes a predetermined program stored in the memory, each function of the judgment unit 21, the drive assist unit 22, the communication unit 23 and the storage unit 24 is fulfilled. Each of such functions will be described below.

The judgment unit 21 judges whether or not there is an action of a person included in the dangerous scene type information stored in the storage unit 24 which is similar to the action of the person recognized based on the image captured by the forward-shooting camera mounted on the vehicle. For example, the judgment unit 21 compares the person recognized based on the image captured by the camera with types of images included in the dangerous scene type information stored in the storage unit 24 and judges that actions are similar when there is a type of image having a predetermined or greater level of similarly relative to the recognized action of the person. A more detailed description will be provided in the following.

For example, if a person waving a hand toward the building S is recognized at a position where the person P in FIG. 2 exists, the judgment unit 21 judges that the recognized action of the person is similar to an action included in the stored dangerous scene type information. Further, when a person turning his/her gaze or face toward the building S is recognized at a position where the plurality of people P shown in FIG. 3 exists, the judging unit 21 judges that the recognized action of the person is similar to an action included in the stored dangerous scene type information.

The drive assist unit 22 in FIG. 1 assists driving by, when the judgment unit 21 judges that the recognized action of the person is similar to an action included in the stored dangerous scene type information, alerting the driver by notifying the driver that an object corresponding to the dangerous scene type information, which has been judged as including a similar action, is likely to appear in the traffic lane ahead of the vehicle. A more detailed description will be provided in the following.

For example, if there is a person waving his/her hand toward the building S at the position of the person P shown in FIG. 2, the drive assist unit 22 alerts the driver to a person moving from the rear of the building S toward the traffic lane T. Further, if there is a person turning his/her face or gaze toward the building S at the position of the plurality of people P shown in FIG. 3, the drive assist unit 22 alerts the driver to a vehicle moving from the rear of the building S toward the traffic lane T.

Such alert may be provided by, for example, outputting a voice message from the speaker or displaying a message via an image including characters, etc. on a display or the like.

The communication unit 23 in the drive assist apparatus 2 shown in FIG. 1 controls communication with another apparatus. For example, the control unit 23 transmits an image captured by the forward-shooting camera mounted on the vehicle to the server 1 and receives the dangerous scene type information as a result of analysis of the image from the server 1.

The storage unit 24 in the drive assist apparatus 2 stores the dangerous scene type information received from the server 1.

It should be noted that the components of the server 1 and of the drive assist apparatus 2 are not limited to the above-mentioned components and an arbitrary component may be added as appropriate.

Figure 4:
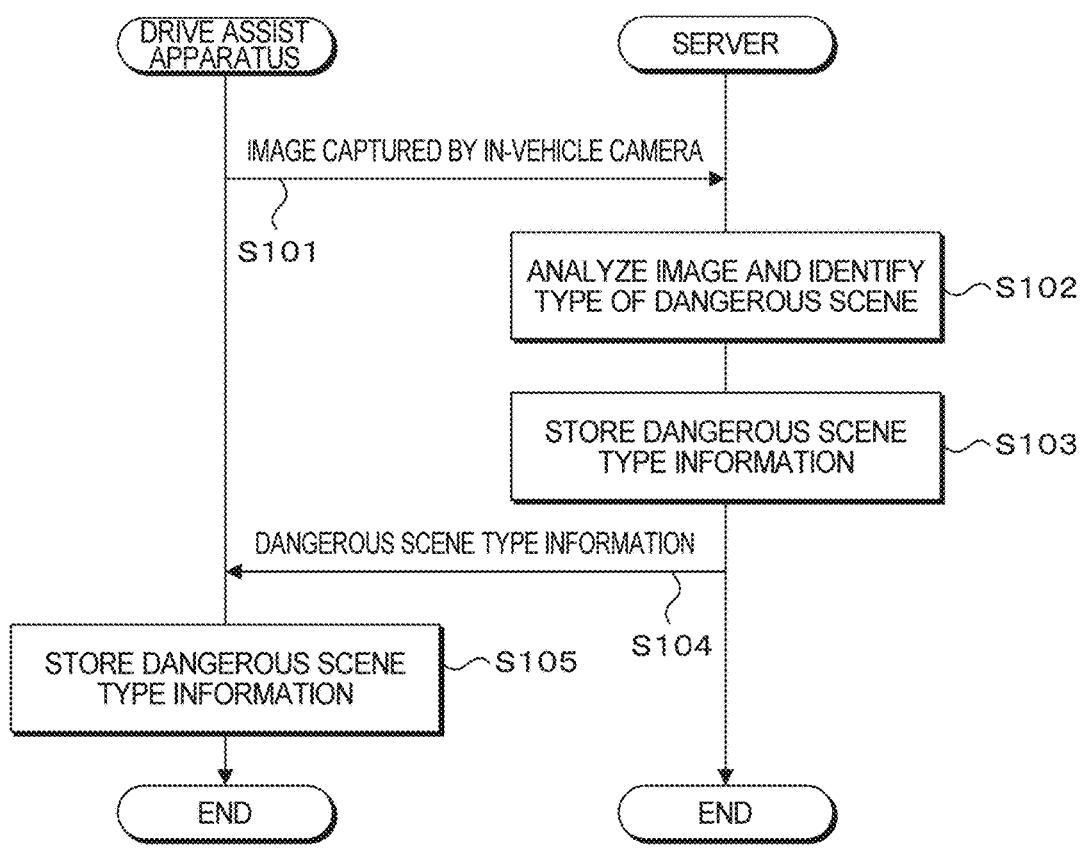
FIG. 4 is a sequence chart illustrating an operation example of accumulating dangerous scene type information.

Next, a description will be made of an example of operations of the drive assist system that includes the drive assist apparatus according to the present embodiment. First, a sequence of operations for accumulating the dangerous scene type information will be described with reference to FIG. 4.

First, the communication unit 23 in the drive assist apparatus 2 transmits an image captured by an in-vehicle forward-shooting camera to the server 1 (step S101).

The image analysis unit 11 in the server 1 then analyzes the image received in step S101 and identifies the type of dangerous scene (step S102).

The storage unit 12 in the server 1 then stores dangerous scene type information including the type of dangerous scene identified in step S102 (step S103).

The communication unit 13 in the server 1 then transmits the dangerous scene type information stored in step S103 to the drive assist apparatus 2 (step S104).

The storage unit 24 in the drive assist apparatus 2 then stores the dangerous scene type information received from the server 1 in step S104 (step S105), and the sequence of operations is terminated.

Figure 5:
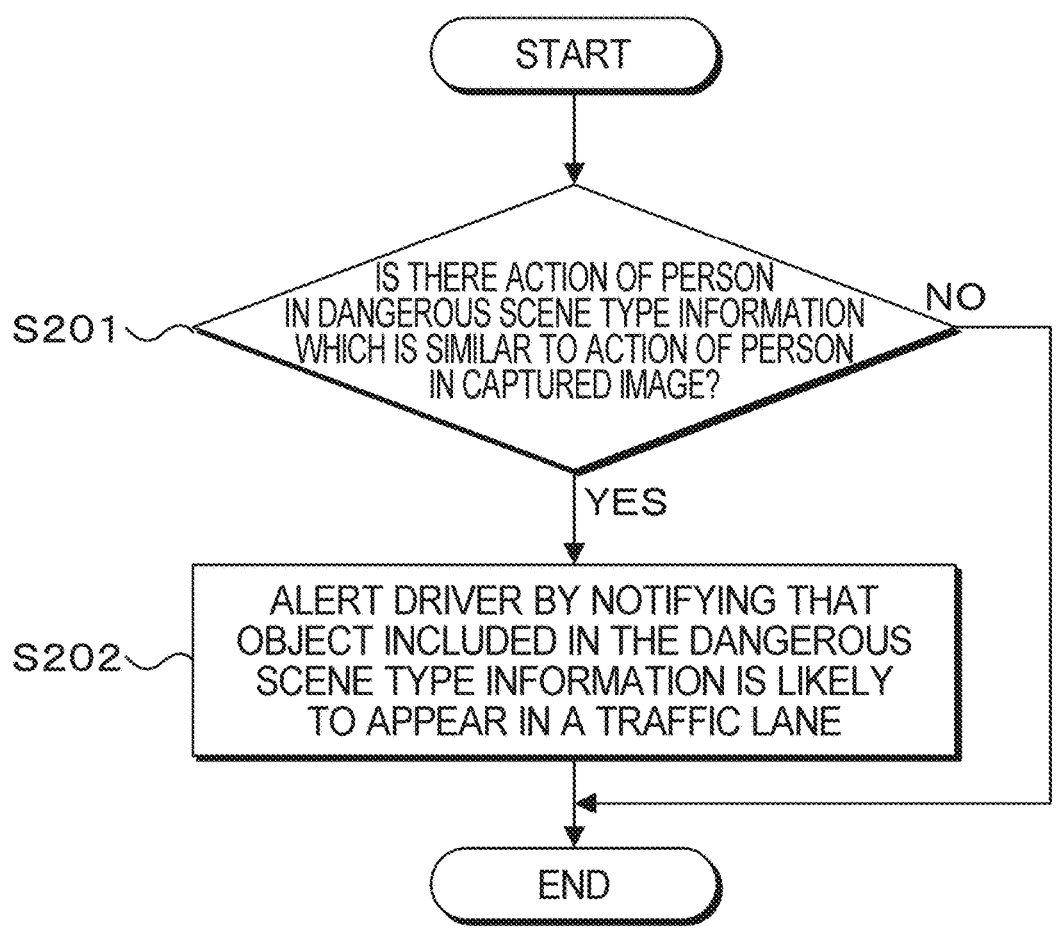
FIG. 5 is a flowchart illustrating an operation example of alerting a driver using the dangerous scene type information.

Next, a sequence of operations for alerting a driver using the dangerous scene type information in the drive assist apparatus 2 will be described with reference to FIG. 5.

First, the judgment unit 21 in the drive assist apparatus 2 judges whether or not there is an action of a person in the dangerous scene type information stored in the storage unit 24 which is similar to an action of a person which is recognized based on an image captured by the in-vehicle forward-shooting camera (step S201). If the judgment result is NO (step S201; NO), then the sequence of operations is terminated.

On the other hand, if the result of judgment in step S201 is YES (step S201; YES), the drive assist unit 22 in the drive assist apparatus 2 alerts a driver by notifying the driver that the object included in the dangerous scene type information which has been judged as including a similar action is likely to appear in the traffic lane ahead of the vehicle (step S202), and the sequence of operations is terminated.

As discussed earlier, according to the drive assist system 100 in the present embodiment, it is possible to analyze the image captured by the in-vehicle forward-shooting camera, identify, in the case where both a person who is performing an action in a direction toward an obstacle located so as to face a traffic lane ahead of the vehicle and an object moving from the rear of the obstacle toward the traffic lane ahead of the vehicle are recognized, the combination of the recognized action of the person and the recognized object as a type of dangerous scene, and store the identified combination as dangerous scene type information.

In addition, it is possible to judge whether or not there is an action of a person in the stored dangerous scene type information which is similar to the action of the person recognized based on the image captured by the in-vehicle camera and, if there is a similar action of a person, alert the driver by notifying the driver that an object corresponding to the dangerous scene type information which has been judged as including a similar action is likely to appear in a traffic lane ahead of the vehicle.

In other words, according to the drive assist system 100 in the present embodiment, it is possible to accumulate, in advance, types of dangerous scenes that the driver cannot predict due to the existence of an obstacle, recognize an action of a person, such as a passerby, using the in-vehicle camera while the vehicle is travelling and, when an action similar to a certain type of dangerous scene is detected, alert the driver by notifying the driver that an object is likely to appear in the traffic lane from the obstacle. Through such configuration, it is possible to prevent accidents that may otherwise occur.

As described above, the drive assist system 100 according to the present embodiment enables the prediction of the likelihood that an object which cannot be detected by an in-vehicle camera will cross a traffic lane.

MODIFICATIONS

The present invention is not limited to the above-mentioned embodiment and may be implemented in various ways without departing from the gist of the invention. Accordingly, the above-mentioned embodiment is merely an example in every respect and should therefore not be interpreted in a limited way. For example, the order of the above-mentioned operation steps may be rearranged as appropriate, or some operations may be performed in parallel, without causing any inconsistency with respect to the content of processing.

Although the dangerous scene type information is stored in both the storage unit of the server 1 and the storage unit of the drive assist apparatus 2 in the embodiment above, the dangerous scene type information may be stored in one of such storage units or stored in a separately-provided storage server device or the like. In such case, the apparatus that does not store the dangerous scene type information may refer to the dangerous scene pattern information via the communication unit.

What is claimed is:

1. A drive assist apparatus mounted on a vehicle, comprising:
   a transmission unit that transmits an image captured by a forward-shooting camera mounted on the vehicle to a server;
   a receiving unit that receives dangerous scene type information from the server, the dangerous scene type information being related to a type of dangerous scene consisting of a combination of a person who performs an action in a direction toward an obstacle located so as to face a traffic lane ahead of the vehicle and an object moving from a rear of the obstacle toward the traffic lane ahead of the vehicle, the action of the person and the object having been recognized by analyzing the image;

a storage unit that stores the received dangerous scene type information;

a judgment unit that judges whether or not there is an action of a person included in the dangerous scene type information stored in the storage unit which is similar to the action of the person recognized based on the image captured by the camera; and a drive assist unit that assists driving by, when the judgment unit judges that there is a similar action of a person, alerting a driver by notifying the driver that an object included in dangerous scene type information which has been judged as including the similar action of a person is likely to appear in the traffic lane ahead of the vehicle.

2. The drive assist apparatus according to claim 1, wherein the receiving unit receives the dangerous scene type information transmitted from the server at least one of: each time the dangerous scene type information is stored in the server; and/or at predetermined intervals.

3. The drive assist apparatus according to claim 1, wherein the person performing an action toward the obstacle is at least one of a person waving one's hand toward the obstacle and/or a person turning one's gaze or face toward the obstacle.

4. The drive assist apparatus according to claim 1, wherein the drive assist unit alerts the driver at least one of: by outputting a voice message from a speaker; and/or by displaying on a display a message constituted by an image including characters.

5. A drive assist system, comprising:

an image analysis unit that analyzes an image captured by a forward-shooting camera mounted on a vehicle and identifies, when recognizing a person performing an action in a direction toward an obstacle located so as to face a traffic lane ahead of the vehicle and an object moving toward the traffic lane ahead of the vehicle from a rear of the obstacle, a combination of the recognized action of a person and the recognized object as a type of dangerous scene;

a storage unit that stores dangerous scene type information related to the identified type of dangerous scene;

a judgment unit that judges whether or not there is an action of a person included in the dangerous scene type information stored in the storage unit which is similar to the action of the person recognized based on the image captured by the camera; and a drive assist unit that assists driving by, when the judgment unit judges that there is a similar action of a person, alerting a driver by notifying the driver that the object in the dangerous scene type information which has been judged as including the similar action of a person is likely to appear in the traffic lane ahead of the vehicle.

6. The drive assist system according to claim 5, wherein the person performing an action toward the obstacle is at least one of a person waving one's hand toward the obstacle and/or a person turning one's gaze or face toward the obstacle.

7. The drive assist system according to claim 5, wherein the drive assist unit alerts the driver at least one of: by outputting a voice message from a speaker; and/or by displaying on a display a message constituted by an image including characters.

* * * * *